US012576764B2

(12) United States Patent
Lan et al.

(10) Patent No.: US 12,576,764 B2
(45) Date of Patent: Mar. 17, 2026

(54) LARGE-STROKE ELECTRIC HEADREST STRUCTURE FOR CAR SEAT

(71) Applicant: Yanfeng International Automotive Technology Co., Ltd., Shanghai (CN)

(72) Inventors: Shunqiang Lan, Shanghai (CN); Xun Tang, Shanghai (CN); Yueyun Chen, Shanghai (CN); Chaogang Xu, Shanghai (CN); Yilin Jin, Shanghai (CN)

(73) Assignee: Yanfeng International Automotive Technology Co., Ltd., Shanghai (CN)

( * ) Notice: Subject to any disclaimer, the term of this patent is extended or adjusted under 35 U.S.C. 154(b) by 191 days.

(21) Appl. No.: 18/565,202

(22) PCT Filed: Jun. 2, 2022

(86) PCT No.: PCT/CN2022/096807
§ 371 (c)(1),
(2) Date: Nov. 29, 2023

(87) PCT Pub. No.: WO2022/257846
PCT Pub. Date: Dec. 15, 2022

(65) Prior Publication Data
US 2024/0300394 A1     Sep. 12, 2024

(30) Foreign Application Priority Data

Jun. 10, 2021    (CN) .......................... 202121303013.8

(51) Int. Cl.
*B60N 2/829*          (2018.01)
(52) U.S. Cl.
CPC .................................... *B60N 2/829* (2018.02)
(58) Field of Classification Search
CPC ...................................................... B60N 2/829
See application file for complete search history.

(56) References Cited

U.S. PATENT DOCUMENTS

| | | | |
|---|---|---|---|
| 8,292,020 B2 | 10/2012 | Hwang et al. | |
| 2015/0130248 A1* | 5/2015 | Line ...................... | B60N 2/829 |
| | | | 297/410 |
| 2021/0276465 A1 | 9/2021 | Eichhorn et al. | |

FOREIGN PATENT DOCUMENTS

| | | |
|---|---|---|
| CN | 102336157 A | 2/2012 |
| CN | 208452842 U | 2/2019 |

(Continued)

OTHER PUBLICATIONS

Extended European Search Report for European Application No. 22819444.5 mailed Mar. 26, 2025, 7 pages.

(Continued)

*Primary Examiner* — Anthony D Barfield
(74) *Attorney, Agent, or Firm* — Cooley LLP

(57)          ABSTRACT

A large-stroke electric headrest structure for a car seat, comprising: two guide rods (1) that are disposed in a same direction; a headrest body (2) externally connected with a slider (21), the slider (21) being provided with two through holes for the guide rods and a threaded through-hole all of which are disposed vertically, and the two guide rods (1) being disposed slidably in the two through holes, respectively; a supporting plate (3) connected to the two guide rods (1) and provided with a vertical through hole (d) aligned with the threaded through-hole; and a driving motor (4) mounted in a tiltable manner on a side of the supporting plate (3) away from the slider (21), wherein an elastic energy-absorbing plate (41) is padded between the driving motor (4) and the supporting plate (3), the driving motor (4) is connected in a transmission manner with a lead screw (42) movably inserted in the vertical through hole (d), an end of the lead screw (42) away from the driving motor (4) is (Continued)

screwed in the threaded through-hole, and a gap is reserved between the vertical through hole (d) and the lead screw (42).

6 Claims, 7 Drawing Sheets

(56)                    References Cited

FOREIGN PATENT DOCUMENTS

| | | | | | |
|---|---|---|---|---|---|
| CN | 109476248 | A | * | 3/2019 | ............. B60N 2/829 |
| CN | 109803851 | A | | 5/2019 | |
| CN | 111391733 | A | | 7/2020 | |
| CN | 212022431 | U | | 11/2020 | |
| CN | 215621577 | U | | 1/2022 | |
| DE | 102016219105 | A1 | | 4/2018 | |
| EP | 3 357 749 | A1 | | 8/2018 | |
| WO | WO-2022257846 | A1 | | 12/2022 | |

OTHER PUBLICATIONS

International Search Report and Written Opinion of the International Searching Authority mailed on Aug. 5, 2022, for PCT Application No. PCT/CN2022/096807, 7 total pages.

* cited by examiner

LARGE-STROKE ELECTRIC HEADREST STRUCTURE FOR CAR SEAT

RELATED APPLICATIONS

This application is a national stage of International Application No. PCT/CN2022/096807, filed Jun. 2, 2022, which claims priority to Chinese Patent Application No. 202121303013.8, filed Jun. 10, 2021. Both of the aforementioned applications are hereby incorporated by reference in their entireties.

TECHNICAL FIELD

The present disclosure relates to the technical field of automobile parts, and specifically relates to a large-stroke electric headrest structure for a car seat.

BACKGROUND ART

With the development of the automobile industry and the change of the automobile market, in order to improve user experience, there are more and higher requirements on the functions that can be achieved by cars and on the comfort. In combination with zero gravity seats, the adjustment stroke of electric headrests of cars is increasing, and the requirements on the arrangement and the structure of the electric headrests are increasingly higher. The adjustment stroke of conventional car seat headrests is short, and after the adjustment stroke of conventional car seat headrests is increased, it is prone to result in locking of the lead screw of the driving motor of the headrest due to issues of accuracy and manufacturing tolerance of parts.

SUMMARY OF THE INVENTION

To overcome the defects existing in the prior art, there is now provided a large-stroke electric headrest structure for a car seat to solve the problem that after the adjustment stroke of a conventional car seat headrest is increased, it is prone to result in locking of the lead screw of the driving motor of the headrest due to accuracy and manufacturing tolerance of parts.

In order to achieve the above-mentioned object, there is provided a large-stroke electric headrest structure for a car seat, comprising:

two guide rods for being vertically disposed on a car seat back, the two guide rods being disposed in a same direction;

a headrest body externally connected with a slider, the slider being provided with two through holes for the two guide rods and a threaded through-hole all of which are disposed vertically, and the two guide rods being disposed slidably in the two through holes, respectively;

a supporting plate connected to the two guide rods and provided with a vertical through hole aligned with the threaded through-hole; and a driving motor mounted in a tiltable manner on a side of the supporting plate away from the slider, wherein the driving motor is connected in a transmission manner with a lead screw movably inserted in the vertical through hole, an end of the lead screw away from the driving motor is screwed in the threaded through-hole, a gap is reserved between the vertical through hole and the lead screw, and when the threaded through-hole and the vertical through hole are not disposed coaxially, the lead screw is tilted in the gap and drives the driving motor to tilt, so as to prevent the driving motor from being locked and thus unable to rotate.

Further, an elastic energy-absorbing plate is padded between the driving motor and the supporting plate, and when the threaded through-hole and the vertical through hole are not disposed coaxially, the driving motor is tilted to press the elastic energy-absorbing plate to cause deflection of the elastic energy-absorbing plate.

Further, each guide rod has a lower end for connection to the car seat back and an opposite upper end, and the supporting plate is connected between the upper ends of the two guide rods.

Further, an upper end opening of the vertical through hole is formed with a flared portion, the elastic energy-absorbing plate is received in the flared portion, the elastic energy-absorbing plate is provided with an insertion hole aligned with the vertical through hole, and the lead screw is movably inserted in the insertion hole.

Further, the elastic energy-absorbing plate is a rubber pad.

Further, the two through holes for the guide rods are respectively disposed at two opposite ends of the slider, and the threaded through-hole is disposed in the middle of the slider.

Further, the headrest body is detachably connected to the slider by a bolt.

The advantageous effects of the present disclosure are that: the driving motor of the large-stroke electric headrest structure for a car seat of the present disclosure is provided outside the headrest body in a tiltable manner, and when the headrest body is disposed slidably on curved guide rods such that the threaded through-hole and the vertical through hole are not disposed coaxially, it is possible to drive the driving motor to tilt by the deflection of the lead screw so that the headrest body can slide smoothly on the guide rods and the locking is prevented, which increases the sliding stroke of the headrest body and can achieve a large-stroke adjustment range of the headrest body (greater than 100 mm). In addition, the assembling structure is simple.

BRIEF DESCRIPTION OF THE DRAWINGS

Other features, objects and advantages of the present application will become more apparent by reading of the detailed description of non-limiting embodiments with reference to the following accompanying drawings.

DETAILED DESCRIPTION OF THE EMBODIMENTS

Figure 1:
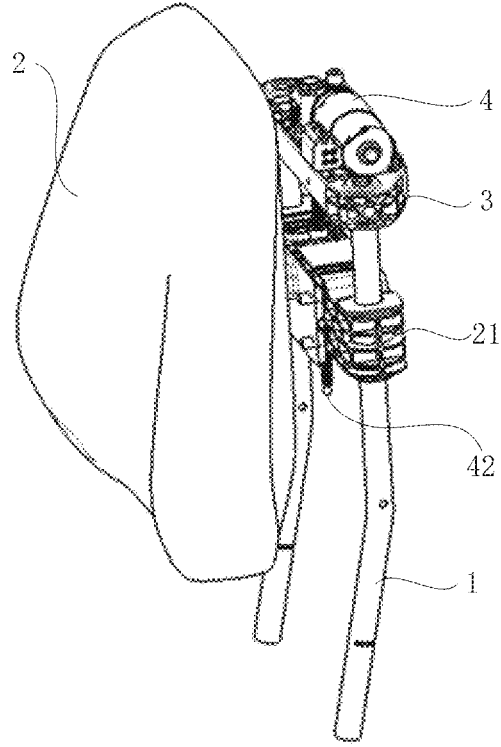
FIG. 1 is a schematic structural view of a large-stroke electric headrest structure for a car seat of an embodiment of the present disclosure.

The present application is described in further detail below in combination with the accompanying drawings and embodiments. It is to be understood that the specific embodiments described herein are merely for explaining the present disclosure, instead of limiting the present disclosure. In addition, it should be noted that, for the convenience of description, only the portions relevant to the present disclosure are shown in the accompanying drawings.

It should be noted that, without conflict, the embodiments and features in the embodiments in the present application may be combined with each other. The present application will be illustrated in detail below with reference to the accompanying drawings and in combination with embodiments.

Referring to FIGS. 1 to 12, the present disclosure provides a large-stroke electric headrest structure for a car seat, comprising: two guide rods 1, a headrest body 2, a supporting plate 3 and a driving motor 4.

The two guide rods 1 are disposed in a same direction. The guide rods 1 are vertically provided on a car seat back.

The headrest body 2 is externally connected with a slider 21. The slider is provided slidably on the two guide rods. Specifically, the slider 21 is provided with two through holes for the guide rods and a threaded through-hole which are arranged vertically. The two guide rods 1 are slidably arranged in the two through holes, respectively.

Figure 2:
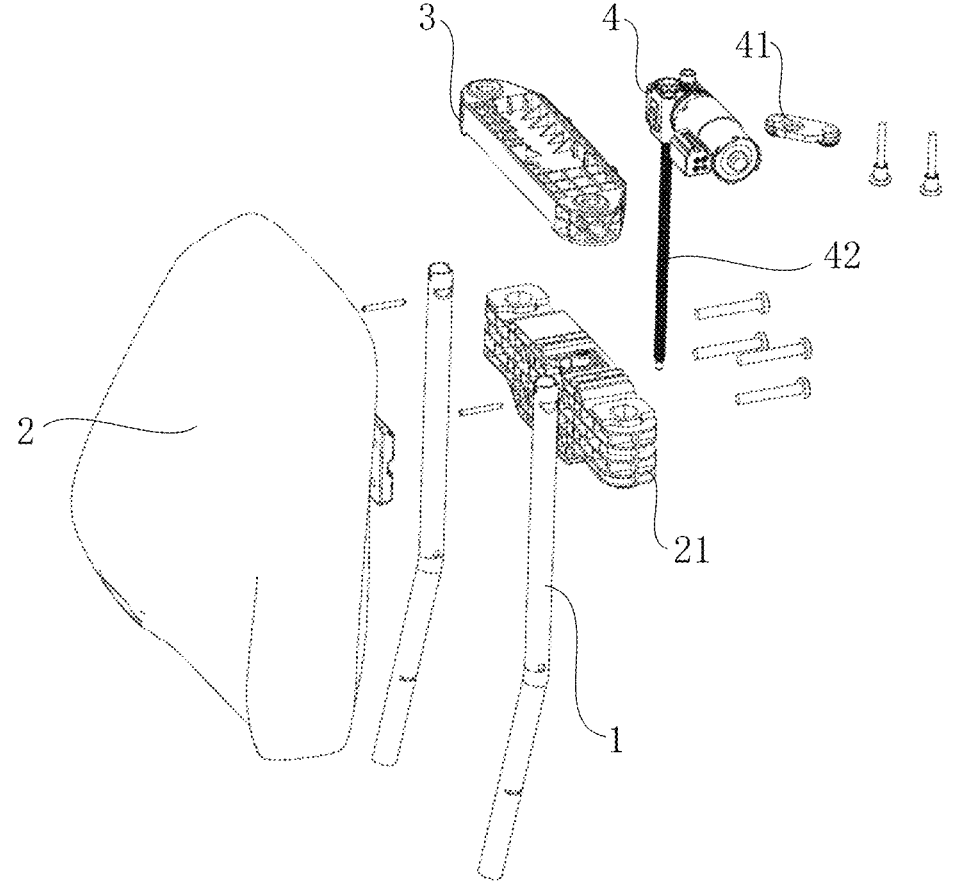
FIG. 2 is an exploded schematic structural view of a large-stroke electric headrest structure for a car seat of an embodiment of the present disclosure.

The supporting plate 3 is connected to the two guide rods 1. The supporting plate 3 is provided with a vertical through hole "d" aligned with the threaded through-hole. As shown in FIG. 2, the supporting plate is connected to the guide rods by a pin, and the supporting plate is provided with a hole aligned with the pin.

The driving motor 4 is mounted on a side of the supporting plate 3 away from the slider 21 in a tiltable manner. Specifically, an elastic energy-absorbing plate 41 is padded between the driving motor 4 and the supporting plate 3. The driving motor 4 is connected with a lead screw 42 in a transmission manner. The lead screw 42 is movably inserted in the vertical through hole "d". An end of the lead screw 42 away from the driving motor 4 is screwed into the threaded through-hole of the slider 21. A gap for the tilting of the lead screw is reserved between the vertical through hole "d" of the supporting plate and the lead screw 42.

In some embodiments, each guide rod includes a first straight rod body, and a second straight rod body connected to the first straight rod body. The first straight rod body and the second straight rod body are disposed to form an angle.

The first straight rod body and the second straight rod body may also be disposed coaxially.

When the driving motor drives the slider by the lead screw to slide on the guide rods, the threaded through-hole and the vertical through hole "d" are disposed coaxially in a normal state. At this time, the lead screw and the vertical through hole of the supporting plate are disposed coaxially, the driving motor drives the slider by the lead screw to slide on the first straight rod body, and the driving motor is not tilted.

In some cases, due to manufacturing accuracy and manufacturing tolerance of parts such as an ultra-long lead screw, the lead screw may deviate from an original rotation axis during a long-stroke movement of the slider on the lead screw, which results in that the lead screw and the vertical through hole are not disposed coaxially (i.e., the lead screw is deflected in the vertical through hole), which in turn causes the lead screw to drive the driving motor to tilt (i.e., deflect by a slight angle), thus placing the driving motor in an offset state. At this time, the driving motor 4 is tilted and offset and thus presses the elastic energy-absorbing plate 41. The elastic energy-absorbing plate absorbs the floating tolerance to prevent the driving motor from being locked and thus unable to rotate.

The driving motor of the large-stroke electric headrest structure for a car seat of the present disclosure is provided in a tiltable manner on the supporting plate outside the headrest body. When the headrest body is disposed slidably on the guide rods and the lead screw is disposed non-coaxially with the vertical through hole, the lead screw deflects to drive the driving motor to tilt or deflect, thus preventing locking of the driving motor, so that the headrest body can slide smoothly on the guide rods. This increases the sliding stroke of the headrest body and can achieve a large-stroke adjustment range of the headrest body (greater than 100 mm). Furthermore, the assembling structure is simple.

In the present embodiment, each guide rod is in an L-like shape. Each guide rod has a lower end which is for connection to a car seat back and an opposite upper end. In some other embodiments, each guide rod is in a linear shape.

In the present embodiment, the slider and the supporting plate are plastic parts. The two through holes are provided at two opposite ends of the slider 21, respectively. The threaded through-hole is provided in the middle of the slider 21. The headrest body 2 is detachably connected to the slider 21 by a bolt.

Figure 10:
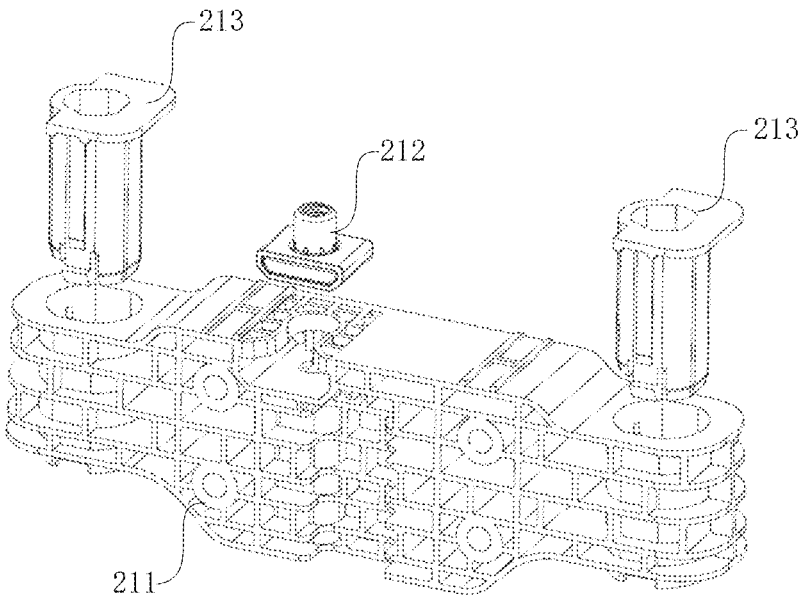
FIG. 10 is an exploded schematic structural view of a slider of an embodiment of the present disclosure.

As a preferred embodiment, as shown in FIG. 10, the slider 21 includes a slider body 211, a lead screw connection nut 212, and a guide sleeve 213. Two ends of the slider body are respectively provided with a spigot-and-socket type through-hole. Each spigot-and-socket type through-hole is inserted with a guide sleeve. Said through holes for the guide rods are formed inside the guide sleeves. The guide rods are slidably inserted in the guide sleeves. A mounting through-hole is formed in the middle of the slider, and the lead screw connection nut is mounted in the mounting through-hole. Said threaded through-hole is formed inside the lead screw connection nut. The lead screw connection nut is screwed to the lead screw.

Referring again to FIG. 2, the headrest body 2 is detachably connected to the slider body 211 by four bolts. Specifically, the slider body 211 is provided with four through holes. The four through holes are disposed along a width direction of the slider body. The headrest body 2 is provided with four threaded holes aligned with the four through holes. Each through hole of the slider body is inserted with a bolt. The screw rod of the bolt extends into a threaded hole in a corresponding position and is screwed to the threaded hole, such that the head of the bolt is pressed against a side of the slider body away from the headrest body.

Figure 3:
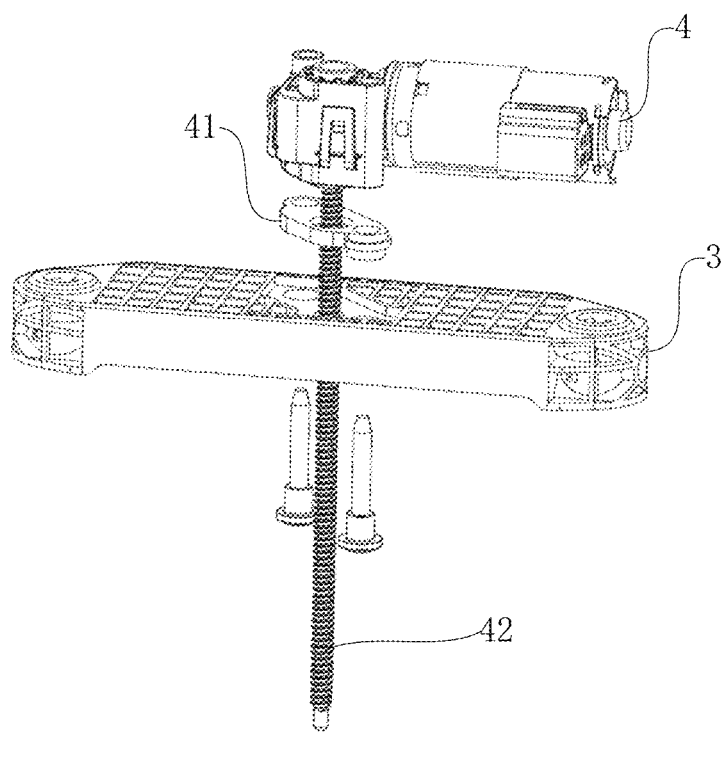
FIG. 3 is a schematic view of the connection of a driving motor and a supporting plate of an embodiment of the present disclosure.
Figure 4:
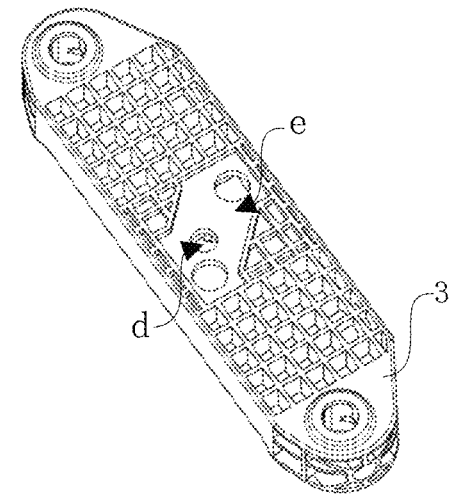
FIG. 4 is a schematic structural view of a supporting plate of an embodiment of the present disclosure.
Figure 5:
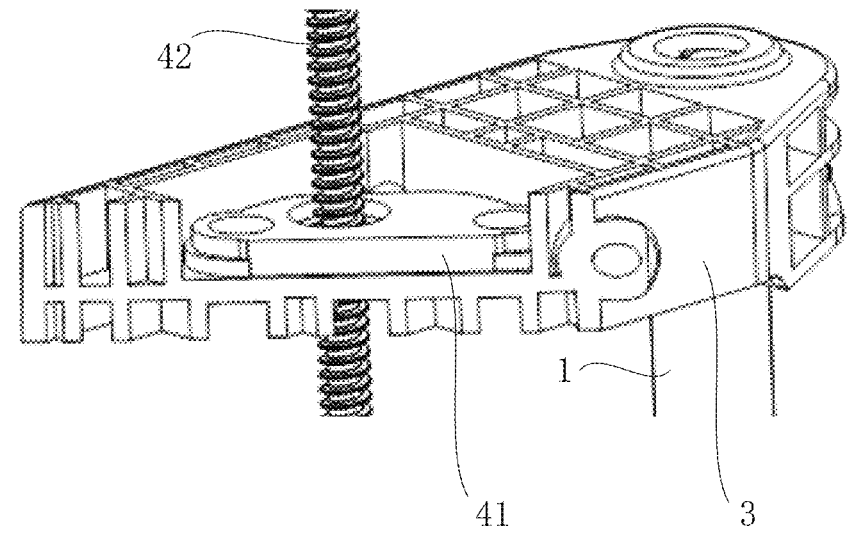
FIG. 5 is a cross-sectional view of a supporting plate of an embodiment of the present disclosure.
Figure 6:
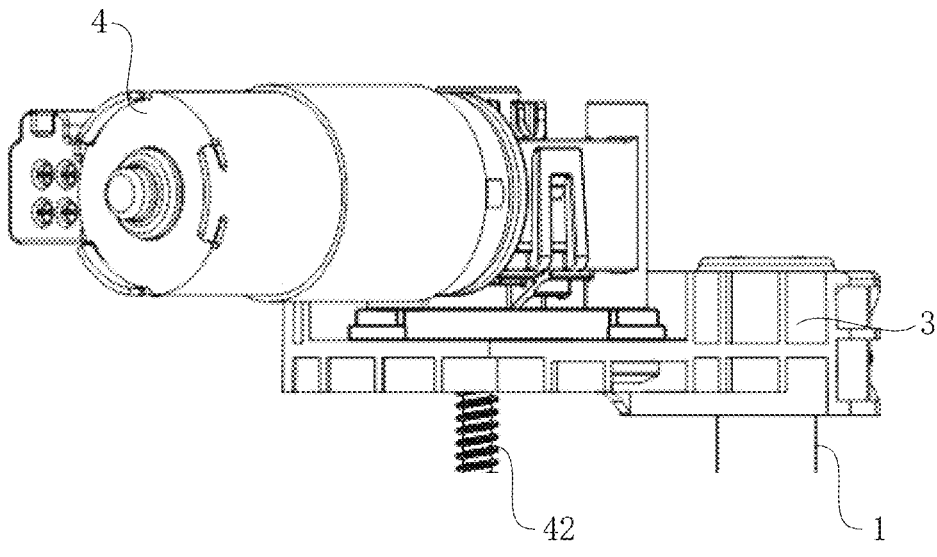
FIG. 6 is a schematic view of the large-stroke electric headrest structure for a car seat of an embodiment of the present disclosure in a state in which the threaded through-hole and the vertical through hole are coaxial.
Figure 7:
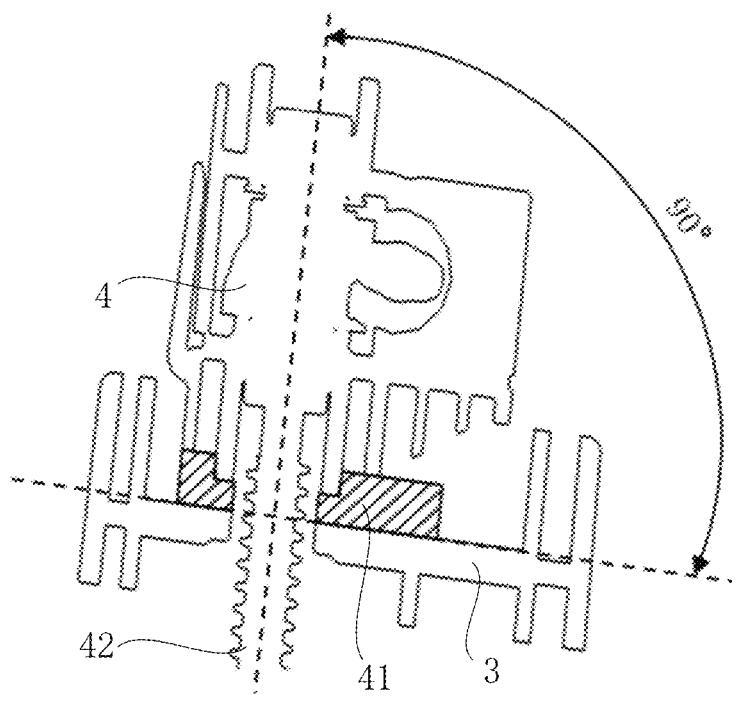
FIG. 7 is a cross-sectional view of the large-stroke electric headrest structure for a car seat of an embodiment of the present disclosure in a state in which the threaded through-hole and the vertical through hole are in a coaxial state.
Figure 8:
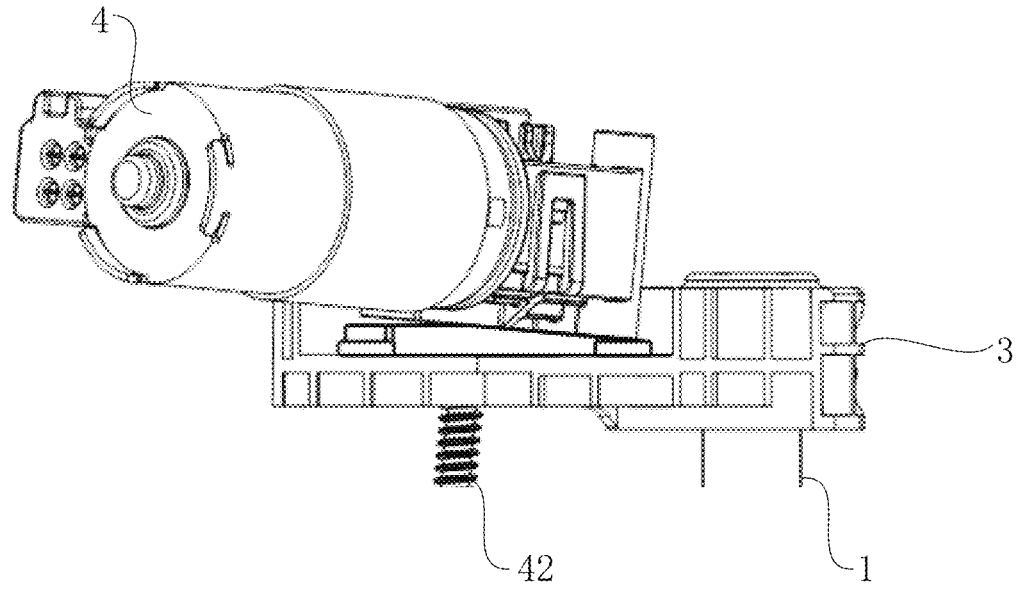
FIG. 8 is a schematic view of the large-stroke electric headrest structure for a car seat of an embodiment of the present disclosure in a state in which the threaded through-hole and the vertical through hole are not coaxial.
Figure 9:
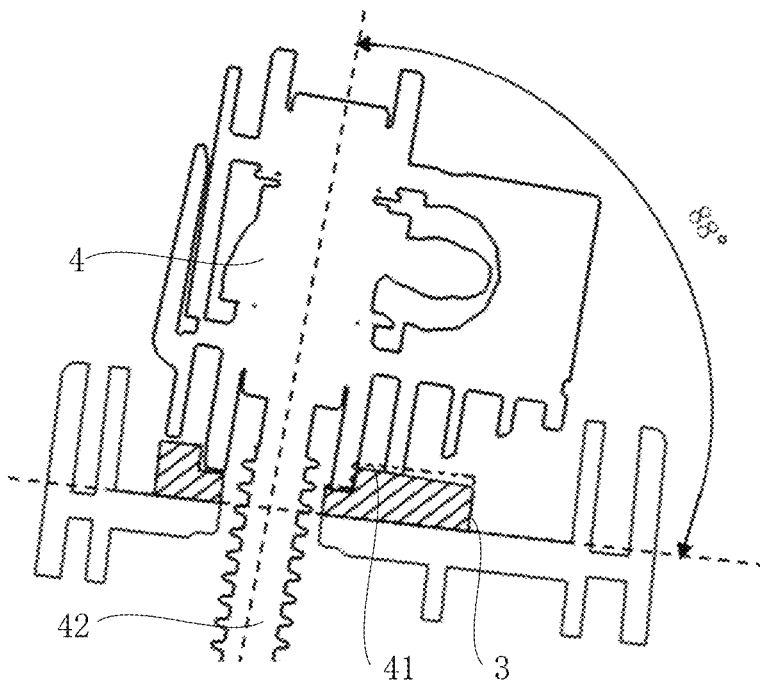
FIG. 9 is a cross-sectional view of the large-stroke electric headrest structure for a car seat of an embodiment of the present disclosure in a state in which the threaded through-hole and the vertical through hole are in a non-coaxial state.

In the present embodiment, the supporting plate 3 is connected between upper ends of the two guide rods 1. The driving motor is disposed in an upper part of the supporting plate. Specifically, as shown in FIGS. 3 to 5, the upper end opening of the vertical through hole "d" of the supporting plate is formed with a flared portion e. The driving motor is movably connected to the upper part of the supporting plate by a bolt. The elastic energy-absorbing plate 41 is received in the flared portion, and the driving motor is placed on the elastic energy-absorbing plate. The elastic energy-absorbing plate 41 is provided with an insertion hole aligned with the vertical through hole "d", and the lead screw 42 is movably inserted in the insertion hole.

With continued reference to FIGS. 3 and 4, the shape and size of the flared portion are adapted to the shape and size of the elastic energy-absorbing plate. The driving motor is movably connected to the upper part of the supporting plate by a bolt. The elastic energy-absorbing plate is embedded in the flared portion and supported by the driving motor.

Figure 11:
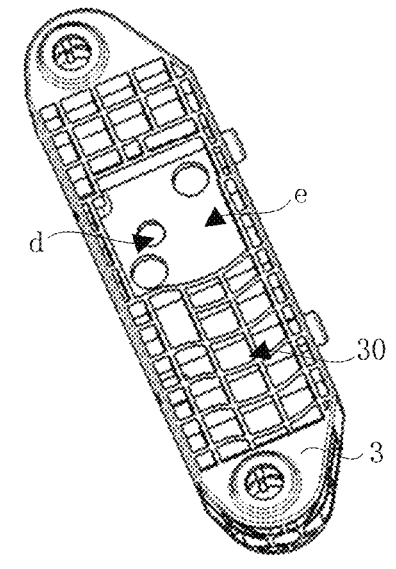
FIG. 11 is a schematic structural view of a limiting groove of the supporting plate of an embodiment of the present disclosure.
Figure 12:
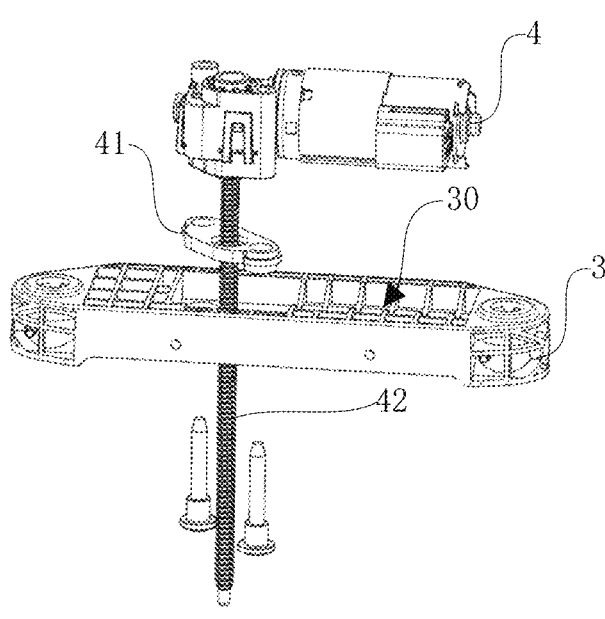
FIG. 12 is a schematic view of the alignment of the driving motor and the limiting groove of the supporting plate of an embodiment of the present disclosure.

In some embodiments, as shown in FIGS. 11 and 12, the upper part of the supporting plate is formed with a limiting groove 30, and the driving motor may be located in the supporting plate in an offset manner and is embedded in the limiting groove. The driving motor is movably connected to the supporting plate by a bolt. When the lead screw deflects, the driving motor is driven to deflect to press the elastic energy-absorbing plate.

FIG. 3 is a schematic view of the connection of the driving motor and the supporting plate of an embodiment of the present disclosure, and FIG. 12 is a schematic view of the alignment of the driving motor and the limiting groove of the supporting plate of an embodiment of the present disclosure, wherein FIG. 12 is another form of FIG. 3. The driving motor of FIG. 3 is located at a central position of the supporting plate, while the driving motor of FIG. 12 is located at an offset position of the supporting plate.

FIG. 4 is a schematic structural view of the supporting plate of an embodiment of the present disclosure, and FIG. 11 is a schematic structural view of the limiting groove of the supporting plate of an embodiment of the present disclosure, wherein FIG. 11 is another form of FIG. 4, and FIG. 11 shows an offset form of the driving motor.

As a preferred embodiment, the elastic energy-absorbing plate 41 is made of an elastic material, and the elastic energy-absorbing plate 41 is a rubber pad. The elastic energy-absorbing plate provided between the driving motor and the supporting plate of the large-stroke electric headrest structure for a car seat of the present disclosure can absorb the floating tolerance of the tilting and offset of the driving motor and adjust the mounting angle of the driving motor in real time, such that the headrest body can smoothly slide on the guide rods, and when the lead screw returns to the state in which it is disposed coaxially with the vertical through hole, the driving motor can be restored quickly under the elastic action of the elastic energy-absorbing plate. This increases the sliding stroke of the headrest body and can achieve a large-stroke adjustment range of the headrest body (greater than 100 mm), and the assembling structure is simple.

What described above are merely preferred embodiments of the present application and explanations of the technical principles that are used. Those skilled in the art will understand that, the scope of disclosure involved in the present application is not limited to the technical solutions formed by particular combinations of the above-mentioned technical features, and it should also encompass other technical solutions formed by any combination of the above-mentioned technical features or equivalents thereof without departing from the concept of the disclosure, for example, technical solutions formed by exchanging the above-mentioned features with (but not limited to) technical features with similar functions as disclosed in the present application.

The invention claimed is:

1. A large-stroke electric headrest structure for a car seat, characterized in that the large-stroke electric headrest structure for the car seat comprises:

two guide rods for being vertically disposed on a car seat back, the two guide rods being disposed in a same direction;

a headrest body externally connected with a slider, the slider being provided with two through holes for the two guide rods and a threaded through-hole all of which are disposed vertically, and the two guide rods being disposed slidably in the two through holes, respectively;

a supporting plate connected to the two guide rods and provided with a vertical through hole aligned with the threaded through-hole; and a driving motor mounted in a tiltable manner on a side of the supporting plate away from the slider, wherein the driving motor is connected in a transmission manner with a lead screw movably inserted in the vertical through hole, an end of the lead screw away from the driving motor is screwed in the threaded through-hole, a gap is reserved between the vertical through hole and the lead screw, and when the threaded through-hole and the vertical through hole are not disposed coaxially, the lead screw is tilted in the gap and drives the driving motor to tilt, so as to prevent the driving motor from being locked and thus unable to rotate;

wherein an elastic energy-absorbing plate is padded between the driving motor and the supporting plate, and when the threaded through-hole and the vertical through hole are not disposed coaxially, the driving motor is tilted to press the elastic energy-absorbing plate to cause deflection of the elastic energy-absorbing plate.

2. The large-stroke electric headrest structure for the car seat according to claim 1, characterized in that each guide rod has a lower end for connection to the car seat back and an opposite upper end, and the supporting plate is connected between the upper ends of the two guide rods.

3. The large-stroke electric headrest structure for the car seat according to claim 2, characterized in that an upper end opening of the vertical through hole is formed with a flared portion, the elastic energy-absorbing plate is received in the flared portion, the elastic energy-absorbing plate is provided with an insertion hole aligned with the vertical through hole, and the lead screw is movably inserted in the insertion hole.

4. The large-stroke electric headrest structure for the car seat according to claim 1, characterized in that the elastic energy-absorbing plate is a rubber pad.

5. The large-stroke electric headrest structure for the car seat according to claim 1, characterized in that the two through holes for the two guide rods are respectively disposed at two opposite ends of the slider, and the threaded through-hole is disposed in the middle of the slider.

6. The large-stroke electric headrest structure for the car seat according to claim 1, characterized in that the headrest body is detachably connected to the slider by a bolt.

\* \* \* \* \*